United States Patent
Kadus et al.

(10) Patent No.: US 9,840,862 B2
(45) Date of Patent: *Dec. 12, 2017

(54) OVEN DOOR OPENING MAGNETIC HINGE

(71) Applicant: Whirlpool Corporation, Benton Harbor, MI (US)

(72) Inventors: Sachin Jaganath Kadus, Pune, IN (US); Arunkumar Ramakrishnan Pillai, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/923,562

(22) Filed: Oct. 27, 2015

(65) Prior Publication Data

US 2016/0047153 A1  Feb. 18, 2016

Related U.S. Application Data

(63) Continuation of application No. 14/294,183, filed on Jun. 3, 2014, now Pat. No. 9,181,737.

(51) Int. Cl.
*E05D 11/10* (2006.01)
*E05C 19/16* (2006.01)
(Continued)

(52) U.S. Cl.
CPC .......... *E05D 11/1064* (2013.01); *E05C 19/16* (2013.01); *E05D 7/00* (2013.01); *E05D 11/0054* (2013.01); *E05F 1/00* (2013.01); *E05F 1/1261* (2013.01); *F16B 1/00* (2013.01); *E05D 2011/0072* (2013.01); *E05Y 2201/46* (2013.01);
(Continued)

(58) Field of Classification Search
CPC ... F16F 15/03; F16F 6/00; F16F 6/005; F24C 15/02; F24C 15/023; E05F 1/1276; E05F 1/1292; E05F 1/1261; E05F 1/1253; E05Y 2201/41; E05Y 2201/412; E05Y 2201/414; E05Y 2201/416; E05Y 2201/40; E05Y 2201/46; E05Y 2900/308; E05D 11/1064
USPC ......... 16/286, 289, 290, 292, 321, 320, 322, 16/306; 49/386, 387, 389, 398, 402;
(Continued)

(56) References Cited

U.S. PATENT DOCUMENTS 3,016,563 A   1/1962  De Jong
3,388,418 A   6/1968  Bey
(Continued)

FOREIGN PATENT DOCUMENTS

DE   202010005948 U1   8/2010

OTHER PUBLICATIONS

European Search Report; Application No. 15167649.1-1607 dated Oct. 14, 2015. pp. 1-5.

*Primary Examiner* — Chuck Mah
(74) *Attorney, Agent, or Firm* — Price Heneveld LLP

(57) ABSTRACT

A hinge for rotatably coupling an appliance door with an appliance body includes an input arm affixable with the body and a housing affixable within the door and coupled with the input arm so as to be rotatable through a range of motion between a closed position and an open position. The hinge further includes a spring engaged between the housing and the input arm and deformable to apply a balancing torque to the housing relative to the input arm and a first magnet coupled with one of the housing and the input arm and magnetically applying a closing torque between the housing relative and the input arm when the housing is within a predetermined range of the closed position.

20 Claims, 4 Drawing Sheets

(51) Int. Cl.
 *E05D 7/00* (2006.01)
 *E05F 1/12* (2006.01)
 *E05D 11/00* (2006.01)
 *E05F 1/00* (2006.01)
 *F16B 1/00* (2006.01)

(52) U.S. Cl.
 CPC . *E05Y 2900/308* (2013.01); *F16B 2001/0035* (2013.01); *Y10T 16/5401* (2015.01)

(58) Field of Classification Search
 USPC ............ 126/190, 191, 192, 285 R, 287, 289; 312/323, 325, 326
 See application file for complete search history.

(56) References Cited

U.S. PATENT DOCUMENTS

| | | |
|---|---|---|
| 3,562,850 A | 2/1971 | Eliason et al. |
| 4,561,130 A | 12/1985 | Bumgardner et al. |
| 6,167,589 B1 | 1/2001 | Luedtke |
| 7,945,997 B2 | 5/2011 | Wang |
| 8,132,292 B2 | 3/2012 | Patterson |
| 8,517,448 B2 | 8/2013 | Krajenke et al. |
| 2009/0199364 A1 | 8/2009 | Patterson |
| 2010/0071157 A1 | 3/2010 | Wang |
| 2010/0251521 A1 | 10/2010 | Donoho |
| 2011/0138572 A1 | 6/2011 | Stuart |
| 2012/0240474 A1 | 9/2012 | Purssey |
| 2013/0097805 A1 | 4/2013 | Bland et al. |

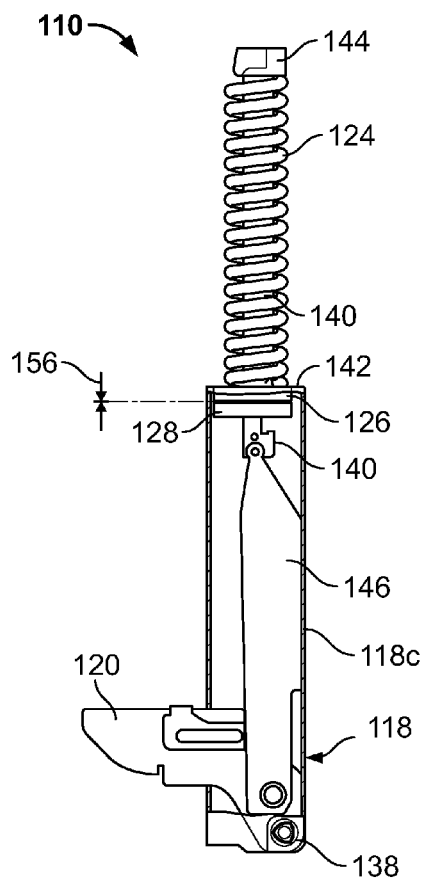
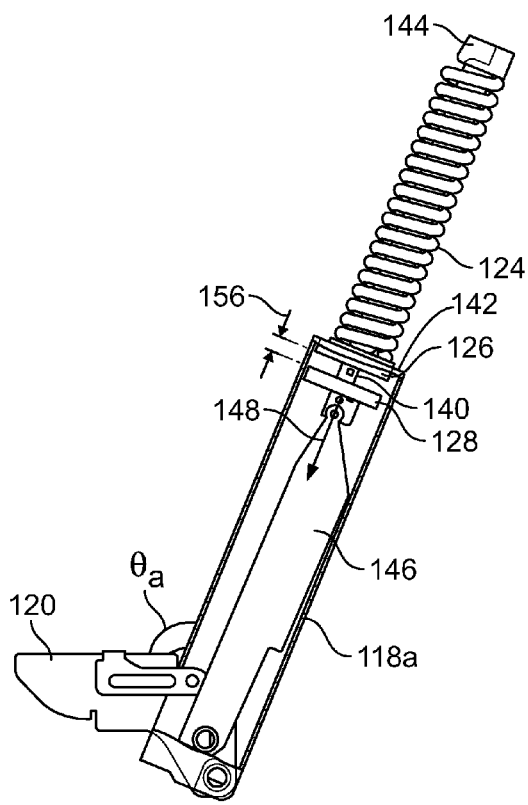
FIG. 7
FIG. 8
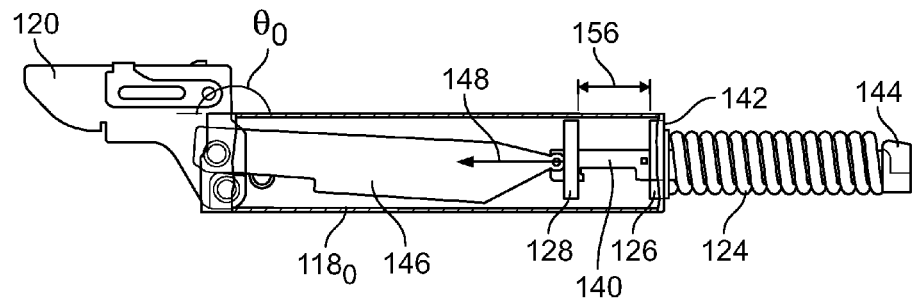
FIG. 9

OVEN DOOR OPENING MAGNETIC HINGE

CROSS REFERENCE TO RELATED APPLICATION

This application is a continuation of U.S. patent application Ser. No. 14/294,183, filed on Jun. 3, 2014, entitled "OVEN DOOR OPENING MAGNETIC HINGE," the disclosure of which is hereby incorporated herein by reference in its entirety.

FIELD OF THE DISCLOSURE

The present invention generally relates to an oven door hinge used to connect the oven door to the main oven unit, and more particularly to an oven door hinge that utilizes magnets to provide a closing force sufficient to keep the door closed against the oven opening.

BACKGROUND OF THE DISCLOSURE

Ovens and other appliances having doors that rotate to open by downward rotation, require hinges connecting the oven door to the main appliance unit that provide a closing force sufficient to keep the door closed against the weight of the door. Such closing force may prevent unintended opening and, in the case of an oven or the like, provide proper insulation. For such operation it is also generally desired for the hinges to also provide balancing force sufficient to maintain a partially open position of the door, as desired by the user. Generally, oven door hinges are configured such that the hinges apply the closing force when the door is at a position within a desired angle from the closed position and such that the balancing force is applied through the remainder of the range of motion provided by the hinge, up until the door is fully opened.

Oven door hinges have used various mechanisms including combinations of linkages, multiple springs, or cams to provide the desired combination of closing and balancing forces within the desired portions of oven door range of motion. Such mechanisms can be mechanically complex, resulting in high tooling and assembly costs and introducing multiple failure modes. Accordingly further advances for hinges used in ovens and other appliances are desired.

SUMMARY OF THE DISCLOSURE

According to one aspect of the present disclosure, a hinge for rotatably coupling an appliance door with an appliance body includes an input arm affixable with the body and a housing affixable within the door and coupled with the input arm so as to be rotatable through a range of motion between a closed position and an open position. The hinge further includes a spring engaged between the housing and the input arm and deformable to apply a balancing torque to the housing relative to the input arm and a first magnet coupled with one of the housing and the input arm and magnetically applying a closing torque between the housing relative and the input arm when the housing is within a predetermined range of the closed position.

According to another aspect of the present disclosure, an appliance includes a body defining an opening with a lower edge and a door positionable over the opening of the body. The appliance further includes a hinge having an input arm coupled to the body and a housing extending along a first axis within the door and rotatably coupled with the input arm such that the door is rotatable adjacent the lower edge of the opening and rotates away from the opening in a vertical direction between a closed position and an open position. The hinge further has a spring engaged between the housing and the input arm and deformable to apply a balancing torque to the input arm relative to the housing that substantially matches a weight torque of the door about the hinge and a first magnet coupled with one of the housing and the input arm and magnetically applying a closing torque between the housing relative and the input arm when the housing is within about 25 degrees from the closed position.

According to yet another aspect of the present disclosure, a hinge for rotatably coupling a door with a body includes a housing extending along a first axis and affixable within the door and an input arm coupled to the housing and rotatable through a range of motion between a closed position and an open position, the input arm being affixable with the appliance body. A spring is engaged between the housing and the input arm and is deformable to apply a balancing torque to the input arm relative to the housing during rotation of the input arm relative to the housing. A first magnet is coupled with one of the housing and the input arm and magnetically applies a closing torque between the housing relative and the input arm when the housing is within a predetermined range of the closed position.

These and other aspects, objects, and features of the present disclosure will be understood and appreciated by those skilled in the art upon studying the following specification, claims, and appended drawings.

BRIEF DESCRIPTION OF THE DRAWINGS

In the drawings:

FIG. 7 is a cutaway view of an alternative hinge showing various internal features thereof in a first position;

FIG. 8 is a further cutaway view of the hinge of FIG. 7 in a second position; and FIG. 9 is a further cutaway view of the hinge of FIG. 3 in a third position.

DETAILED DESCRIPTION OF THE EMBODIMENTS

Figure 1:
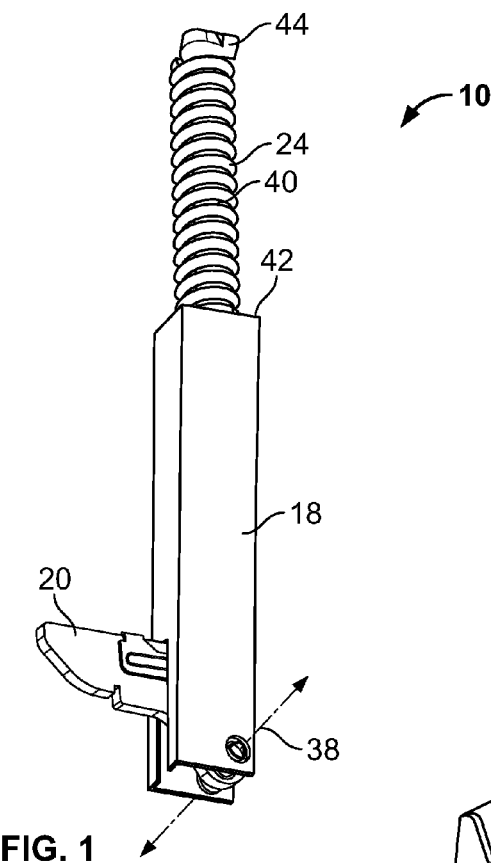
FIG. 1 is a perspective view of a hinge.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1-9, reference numeral 10 generally designates a hinge for rotatably coupling a door 12 of an appliance 14 with a body 16 thereof. Hinge 10 includes an input arm 20 affixable with the body 16 and a housing 18 affixable within the door 12 and coupled with the input arm so as to be rotatable through a range of motion 22 (FIG. 6) between a first position (for example, housing $18_c$ in FIG. 3) and a second position (for example, housing $18_o$ in FIG. 5). A spring 24 is operably engaged between the housing 18 and the input arm 20 to apply a balancing torque to the housing 18 relative to the input arm 20. A first magnet 26 is fixed relative to the housing 18, and a second magnet 28 is movably received within the housing 18 and is operatively coupled with the input arm 20 so as to be positioned adjacent the first magnet 26 when the housing 18 is in the first position and moved away from the first magnet 26 by rotation of the housing 18 with respect to the input arm 20 from the first position toward the second position. A mutual attraction between the first and second magnets 26 and 28 applies a closing torque to the housing 18 relative to the input arm 20 when the housing 18 is within about 25 degrees from the first position.

Figure 2:
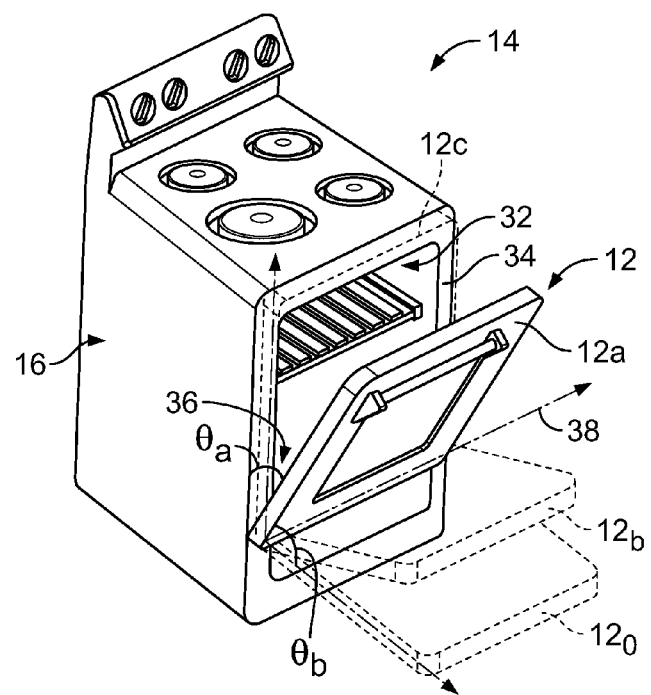
FIG. 2 is a perspective view of an oven with which one or more hinges according to FIG. 1 can be used.

As shown in FIG. 2, appliance 14 can be in the form of an oven or another similar appliance wherein a door 12 is mounted to the body 16 of the appliance to cover an opening 32 along a vertical face 34 of the appliance 14, and more particularly, one in which one or more hinges 10 rotatably couple door 12 to the body 16 at a location adjacent a lower edge 36 of the opening 32. In such an arrangement the hinges 10 provide for rotation of door 12 about a horizontal axis 38 such that the door 10 opens in a vertical direction, downward and away from the opening 32. In an appliance 14 with a door 12 positioned for such downwardly rotating opening, it may be desired to provide a hinge 10 that is capable of balancing against the weight of a partially opened door through a range of possible positions of door 12 such that a user may open door 12 to a desired, partially-open position that the hinge 10 will maintain.

Further, additional functionality may be desired in which the hinge 10 can facilitate complete and secure closing of a door 12 over an opening 32 of an appliance 14. This functionality can help to fully close door 12 when a user, for example, brings the door 12 to within a predetermined range proximate to the fully closed position (as indicated by door $12_c$ in FIG. 2). Further hinge 10 can be configured to provide an additional force to help maintain the door 12 in a fully closed position against body 16. This force may supplement the force of the spring 24, which may be low or zero in the instance of a fully closed door $12_c$. Both the balancing force and the closing force may be referred to as a balancing torque and a closing torque, as the forces related thereto are applied about axis 38. Aspects of hinge 10 that provide the balancing torque and closing torque are discussed further herein.

Figure 3:
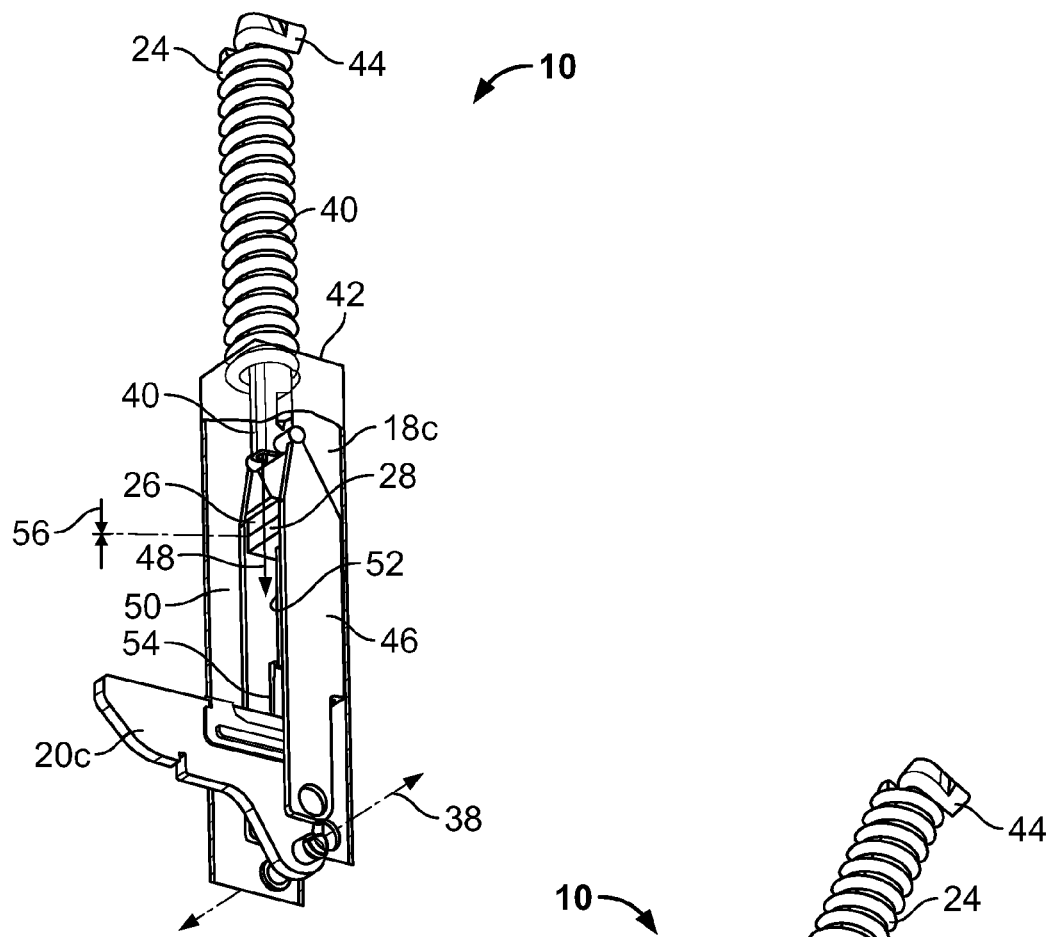
FIG. 3 is a cutaway view of a hinge showing various internal features thereof in a first position.
Figure 4:
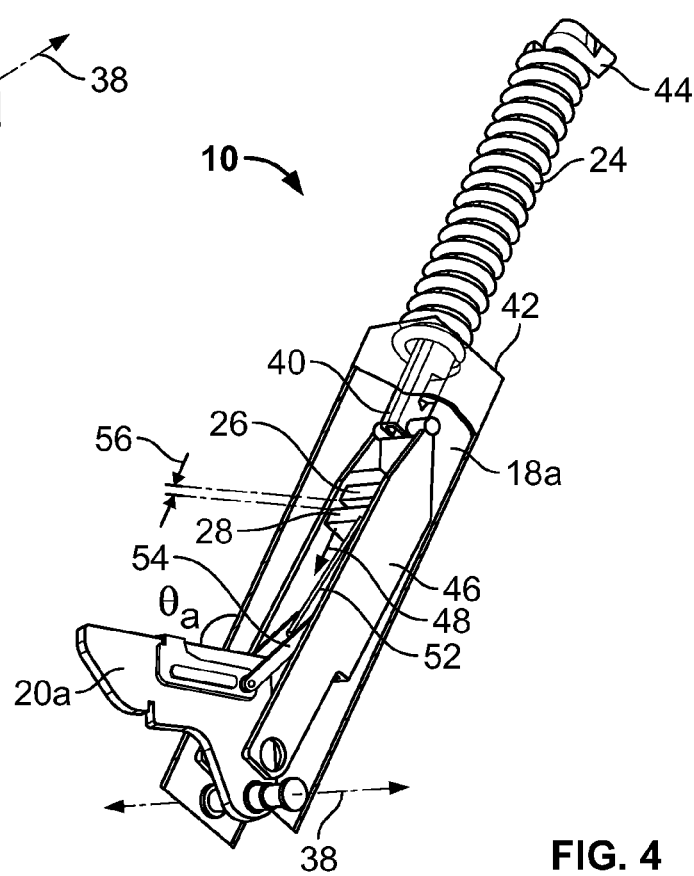
FIG. 4 is a further cutaway view of the hinge of FIG. 3 in a second position.
Figure 5:
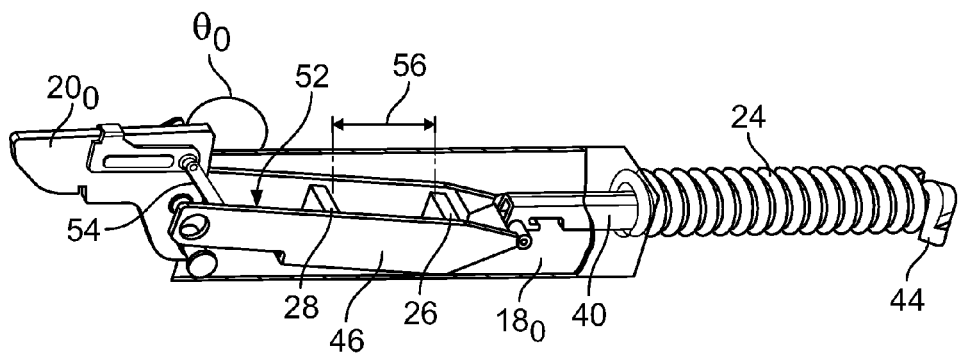
FIG. 5 is a further cutaway view of the hinge of FIG. 3 in a third position.

FIGS. 3-5 show an embodiment of a hinge 10 including a spring 24 and a pair of magnets including a first magnet 26 and a second magnet 28. As shown a slider 40 extends axially out of an end 42 of housing 18 opposite input arm 20. Spring 24 is positioned over and surrounding slider 40 and is captured between end 42 of housing and flange 44 on the opposite end of slider 40 therefrom. Slider 40 is operatively coupled with input arm by connector 46, which is rotatably coupled with input arm 20 at a location spaced apart from the rotatable coupling between input arm 20 and housing 18. Accordingly, when housing 18 is rotated relative to input arm 20 (such as by rotation of door 10, to which housing 18 is attached) connector 46 moves relative to housing 18 in a direction away from end 42, thereby moving slider 40 in the axial direction 48, as shown in FIG. 4, in which housing 20a has been rotated relative to input arm 20 by approximately 25°. Such movement causes compression of spring 24, thereby increasing the spring force proportionate to the spring coefficient thereof. The particular spring coefficient of spring 24 may vary according to the geometry of hinge 10, including the amount of compression imparted on spring 24 by rotation of housing 18 relative to input arm 20, as well as the weight of door 12 such that spring 24 applies the desired balancing torque about axis 38 (which may also include an allowance for internal friction among components). This operation is reversed during closing of door 12.

As further shown in FIGS. 3-5, each of first magnet 26 and second magnet 28 are positioned within a chamber 50, which is positioned within and connected to housing 18. First magnet 26 is fixed within chamber 50, and second magnet 28 is slidably received within chamber 50 so as to be moveable toward and away from first magnet 26. A bar 52 is rigidly connected to second magnet 28 and bar 52 is coupled with input arm 20 by link 54. Link 54 is rotatably coupled with bar 52 at an end thereof opposite second magnet 28 and is further rotatably coupled with input arm at a location remote from axis 38. By this arrangement, rotation of housing 18 relative to input arm 20 causes second magnet 28 to move away from first magnet 26. In the example shown in FIGS. 3-5, link 54 is rotatably coupled with input arm 20 at a location farther from axis 38 than the location of rotatable coupling of connector 46 with input arm 20, which causes second magnet 28 to move through a distance greater than slider 40 for a given rotation of housing 18 relative to input arm 20.

First magnet 26 and second magnet 28 are arranged so as to be mutually attracted to each other. As with magnets in general, the amount of mutual attraction between first magnet 26 and second magnet 28 depends on the distance therebetween, as well as the size and magnetic field strength of the magnets. In an example first magnet 26 and second magnet 28 can each have a magnetic field strength between about 1 T and 1.5 T. As shown in FIG. 3, the distance 56 between first magnet and second magnet 28 is zero when housing $18_c$ is in the position that corresponds to a fully closed door $12_c$ (FIG. 2). Accordingly, in such a position, the mutual attraction between first magnet 26 and second magnet 28 is greatest in such a positioning of housing $18_c$ relative to input arm 20. This mutual attraction resists movement of second magnet 28 relative to first magnet 28 and, accordingly, rotational movement of housing $18_c$ relative to input arm 20. This additional force helps maintain door $12_c$ in the closed position relative to body 16, as described above, through the application of a closing torque about axis 38. In an embodiment, the closing torque applied when housing $18_c$ is in the closed state can be between about 60 N-m and 80 N-m. In a more particular embodiment, the closing torque in associated with the closed position of housing $18_c$ can be about 70 N-m.

As shown in FIGS. 3 and 4, the above-describe coupling of slider 40 and second magnet 28 with input arm 20 is such that second magnet 28 moves away from first magnet simultaneously with compression of spring 24 by rotation of housing 18 relative to input arm 20. Such movement of housing 18 is implemented by, for example, an opening movement of door 12 relative to body 16 of an associated appliance 14, such as by downward rotation thereof. During initial rotation of housing 18, first magnet 26 and second magnet 28 move away from each other but remain proximate to each other such that the mutual attraction therebetween remains appreciably present. In an example, the strength of first and second magnets 26 and 28, as well as the proportion of movement of second magnet 28 relative to the rotation of housing 18 can be such that the mutual attraction between first magnet 26 and second magnet 28 remains appreciably present through an auto-closing range of motion. As illustrated in FIG. 4, such an auto-closing range of motion can be a rotational range of motion $\Theta_a$ of housing $18_a$ relative to the closed position of housing $18_c$ (FIG. 3). In an embodiment, the auto-closing range of motion $\Theta_a$ can be through a rotation of between about 15° and 45°, and in a particular embodiment, a rotation of about 25°. Such a range can also apply to movement of door 12 relative to body 16, as depicted by the position of door $12_a$ in FIG. 2, which has been rotated to the end of auto-closing range $\Theta_a$. Such a range may correspond to a distance 56 between first magnet 26 and second magnet 28 of between 4 mm and 5 mm and in one embodiment about 4.13 mm.

The appreciable mutual attraction between first and second magnets 26 and 28 within auto-closing range $\Theta_a$ is such that an auto-closing torque is applied about axis 38, acting through housing 18 to urge door 12 toward the closed position (door $12_c$ in FIG. 2). In an example, the auto-closing torque can be such that, if door 12 is moved from a position farther open than auto-closing range $\Theta_a$ (for example, within balancing range $\Theta_b$, as shown in connection with door $12_c$ in FIG. 2 and with housing $18_b$ in FIG. 5) into auto-closing range $\Theta_a$ and then let go, the auto-closing torque will act on door $12_a$ to bring it to the closed position of door $12_c$ (FIG. 2). In a further example, if door $12_c$ is moved from out of the closed position to a position within auto-closing range $\Theta_a$ and then released, the auto-closing torque will move door $12_a$ back to the closed door $12_c$ position.

Once housing 18 is moved outside of the auto closing range $\Theta_a$ toward the open door $12_o$ position, shown in FIG. 5 by movement of door 12 toward the open door $12_o$ position (FIG. 2), first magnet 26 and second magnet 28 will have been moved far enough apart such that the mutual attraction therebetween is no longer sufficient to produce an auto-closing torque. For example, a mutual attraction between first magnet 26 and second magnet 28 may be present, but the torque produced about axis 38 may not be sufficient to overcome the inertia of door $12_b$ when positioned within the balancing range $\Theta_a$ between the auto-closing range $\Theta_a$ and the open door $12_o$ position. Such a force may also be insufficient to produce a torque that is sufficient to overcome the resting friction between the various components of hinge 10. As such, when housing $18_b$ is in the balancing range $\Theta_b$, a selected position thereof may be maintained by the balancing torque applied by the spring 24 due to the increased compression thereof. When in the fully open door $12_o$ position, such positioning of door $12_o$ and housing $18_o$ may be maintained by the mechanical limits of hinge 10 or by the geometry of appliance 14 or by a combination thereof with the balancing torque provided by spring 24.

Figure 6:
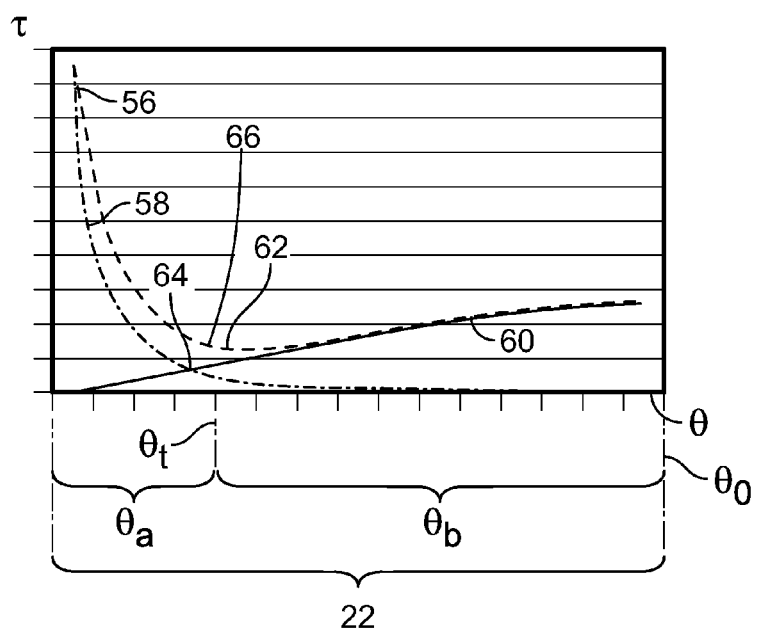
FIG. 6 is a graph showing the levels of various torques provided by the hinge throughout a range of motion thereof.

As shown in the graph of FIG. 6, the peak 56 of the auto-closing torque, represented by line 58 corresponds to the position of door $12_c$ and housing $18_c$ when closed and in which second magnet 28 contacts first magnet 26. With movement of door $12_a$ away from the closed position and toward the open door $12_o$ position, the mutual attraction between first magnet 26 and second magnet 28 decreases logarithmically with the corresponding movement of second magnet 28 away from first magnet 26. During this movement, movement of slider 40 begins to compress spring 24 such that the balancing torque, represented by line 60, which is combined with auto closing torque 58 to achieve a total torque 62.

The transition $\Theta_t$ from the auto-closing range $\Theta_a$ to the balancing range $\Theta_b$ occurs when the torque provided by the attraction between first magnet 26 and second magnet 28 reaches a minimum level 64. In an example, such a minimum level 64 may be such that the total torque 62 is only sufficient to balance against the increasing opposite torque provided by the weight of door 12 as the moment arm thereof increases in horizontal length. Continued compression of spring 24 results in an increase in balancing torque 60 that corresponds to the increasing torque (e.g. between 0 and 30 N-m) applied about axis 38 by door $12_b$ by selection of a spring 24 with a coefficient that corresponds to the movement of slider 40 achieved by the geometry of hinge 10. The combination of the torques provided by the balancing torque 60 and the auto-closing torque 58, thusly, provides the movement characteristics for door 12 described above. In an embodiment, the auto-closing torque at a point 66 where door 12 is at the transition angle $\Theta_t$ can be about 3 N-m or less and, in one embodiment can be about 2.7 N-m. Continued movement of door $12_b$ within the balancing position can further decrease the auto-closing torque below the level at the transition angle $\Theta_t$.

FIGS. 7-9 show another embodiment of a hinge 110 that can carry out the auto-closing and balancing functionality described above with respect to FIGS. 1-6. As with the previous embodiment, hinge 110 includes including a spring 124 and a pair of magnets including a first magnet 126 and a second magnet 128. Slider 140 extends axially out of end 142 of housing 118 opposite input arm 120. Spring 124 is positioned over and surrounding slider 140 and is captured between end 142 of housing and flange 144 on the opposite end of slider 140 therefrom. Slider 140 is operatively coupled with input arm 120 by connector 146, which is rotatably coupled with input arm 120 at a location spaced apart from the rotatable coupling between input arm 120 and housing 118. Accordingly, when housing 118 is rotated relative to input arm 120 (such as by rotation of door 12, to which housing 118 may be attached in a manner similar to that of housing 18, described above) connector 146 moves relative to housing 118 in a direction away from end 142, thereby moving slider 140 in the axial direction 148, as shown in FIG. 8, in which housing $118_a$ has been rotated relative to input arm 120 by approximately 25°. Such movement causes compression of spring 124, thereby increasing the spring force proportionate to the spring coefficient thereof. The particular spring coefficient of spring 124 may vary according to the geometry of hinge 110, including the amount of compression imparted on spring 124 by rotation of housing 118 relative to input arm 120, as well as the weight of door 112 such that spring 124 applies the desired balancing torque about axis 138 in a manner similar to that described above, including with reference to FIG. 6. This operation is reversed during closing of door 12.

As further shown in FIGS. 7-9, first magnet 126 is fixed within housing 118, and second magnet 128 is fixed with slider 140 so as to be moveable with slider 140 within housing 118 and moveable toward and away from first magnet 126. By this arrangement, rotation of housing 118 relative to input arm 120 causes second magnet 128 to move away from first magnet 126 by the same distance and the compression of spring 124. As shown in FIG. 7, the distance 156 between first magnet 126 and second magnet 128 is zero when housing 118 is in the position that corresponds to a fully closed door $12_c$ (FIG. 2) such that the force provided by the mechanism (i.e. the closing force) is provided by both the spring and the magnets. Initially during opening of door $12_a$ corresponding to the movement of housing $118_a$ within auto-closing range $\Theta_s$, shown in FIG. 8, the first magnet 126 and second magnet 128 continue to contribute an appreciable auto-closing torque, as described above with respect to FIG. 6 (and with quantities that can be the same as or similar to those described above with respect to hinge 10 in FIGS. 3-5). As also described above, movement of door $12_b$ to within balancing range $\Theta_b$ results in the auto-closing torque being lower than that needed to implement auto-closing of door 12, at which point spring 124 and the torque about axis 138 provided thereby continues to balance against the weight torque of door 12, thereby maintaining a selected position of door within balancing range $\Theta_b$ up to the fully open housing $118_o$ position (as shown in FIG. 9).

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A hinge for rotatably coupling an appliance door with an appliance body, comprising:
   an input arm affixable with the body;
   a housing affixable within the door and rotatably coupled to the input arm so as to be rotatable about the input arm through a range of motion between a closed position and an open position;
   a spring engaged between the housing and the input arm and deformable to apply a balancing torque to the housing relative to the input arm;
   a first magnet coupled with one of the housing and the input arm and a magnetically attractable element coupled with the other of the input arm and the housing, the first magnet magnetically applying a closing torque between the housing and the input arm by mutual attraction with the magnetically attractable element when the housing is within about 25 degrees of the closed position.

2. The hinge of claim 1, wherein the magnetically attractable element is a second magnet coupled with the other of the housing and the input arm such that the first magnet and the second magnet are positioned adjacent each other when the housing is in the closed position and are moved away from each other by rotation of the housing with respect to the input arm from the closed position toward the open position.

3. The hinge of claim 2, wherein:
   the first magnet is fixedly coupled with the housing;
   the second magnet is movably received within the housing and operatively coupled with the input arm so as to be moveable toward and away from the first magnet with rotation of the housing with respect to the input arm into and out of the closed position, respectively; and
   a mutual attraction between the first and second magnets applies the closing torque between the housing relative and the input arm when the housing is within about 25 degrees from the closed position.

4. The hinge of claim 2, further including a slider operatively coupled with the input arm and extending through an opening in the housing, the spring being engaged between the housing and the slider to engage the spring with the input arm, wherein:
   the first magnet is fixedly coupled to the housing adjacent the first end thereof, the slider further passing through an opening in the first magnet; and
   the second magnet is fixedly coupled with the slider.

5. The hinge of claim 2, further including:
   a chamber fixed within the housing, the first magnet being fixed within the chamber and the second magnet being slidably received within the chamber;
   a bar rigidly attached to the second magnet; and
   a link operably connecting the input arm to the second magnet.

6. The hinge of claim 1, wherein:
   the balancing torque increases with rotation of the housing from the closed position toward the open position;

the closing torque decreases with rotation of the housing from the closed position toward the open position, the closing torque falling below an effective threshold level with rotation of the housing outside of the predetermined range.

7. The hinge of claim 1, wherein:
a peak closing torque is applied on the input arm by the magnet when the housing is in the closed position; and
a peak balancing torque is applied on the input arm by the spring when the input arm is in the open position.

8. The hinge of claim 7, wherein the peak closing torque is at least three times the peak balancing torque.

9. The hinge of claim 1, further including a slider extending along a first axis through an opening in an end of the housing, the slider at least partially operatively coupling the spring with the input arm;
wherein:
the housing extends along the first axis; and
the spring surrounds the slider and is captured between a portion of the slider and a portion of the housing such that compression of the spring between the portion of the slider and the portion of the housing applies the balancing torque.

10. The hinge of claim 1, further including a connector rotatably coupled with the input arm and at least partially operably engaging the input arm with the spring.

11. An appliance, comprising:
a body defining an opening with a lower edge;
a door positionable over the opening of the body; and
a hinge, including:
an input arm coupled to the body;
a housing extending along a first axis within the door and rotatably coupled with the input arm such that the door is rotatable adjacent the lower edge of the opening and rotates away from the opening in a vertical direction between a closed position and an open position;
a spring engaged between the housing and the input arm and deformable to apply a balancing torque to the input arm relative to the housing that substantially matches a weight torque of the door about the hinge; and
a first magnet coupled with one of the housing and the input arm and a magnetically attractable element coupled with the other of the input arm and the housing, the first magnet magnetically applying a closing torque between the housing relative and the input arm by mutual attraction with the magnetically attractable element when the housing is within about 25 degrees from the closed position.

12. The hinge of claim 11, wherein the magnetically attractable element is a second magnet coupled with the other of the housing and the input arm such that the first magnet and the second magnet are positioned adjacent each other when the housing is in the closed position and are moved away from each other by rotation of the housing with respect to the input arm from the closed position toward the open position;
wherein a mutual attraction between the first and second magnets applies the closing torque between the housing relative and the input arm when the housing is within about 25 degrees from the closed position.

13. The hinge of claim 12, wherein:
the first magnet is fixedly coupled with the housing; and
the second magnet is movably received within the housing and operatively coupled with the input arm so as to be moveable toward and away from the first magnet with rotation of the housing with respect to the input arm into and out of the closed position, respectively.

14. The appliance of claim 11, wherein:
the spring is operably engaged between the housing and the input arm such that the balancing torque increases with movement of the door from the closed position toward the open position; and
the closing torque decreases with movement of the door from the closed position toward the open position.

15. The appliance of claim 14, wherein the closing torque falls below an effective threshold level with rotation of the door by more than 25 degrees from the closed position.

16. The appliance of claim 14, wherein:
the hinge further includes a slider extending along a first axis through an opening in an end of the housing, the slider at least partially operatively coupling the spring with the input arm;
the housing extends along the first axis; and
the spring surrounds a portion of the slider and is captured between a portion of the slider and a portion of the housing such that compression of the spring between the portion of the slider and the portion of the housing applies the balancing torque.

17. A hinge for rotatably coupling a door with a body, comprising:
a housing extending along a first axis and affixable within the door;
an input arm rotatably coupled to the housing so as to be rotatable through a range of motion between a closed position and an open position, the input arm being affixable with the appliance body;
a spring engaged between the housing and the input arm and deformable to apply a balancing torque to the input arm relative to the housing during rotation of the input arm relative to the housing; and
a first magnet coupled with one of the housing and the input arm and a magnetically attractable element coupled with the other of the input arm and the housing, the first magnet magnetically applying a closing torque between the housing and the input arm by mutual attraction with the magnetically attractable element when the housing is within about 25 degrees of the closed position.

18. The hinge of claim 17, wherein the magnetically attractable element is a second magnet coupled with the other of the housing and the input arm such that the first magnet and the second magnet are positioned adjacent each other when the housing is in the closed position and are moved away from each other by rotation of the housing with respect to the input arm from the closed position toward the open position, wherein:
a mutual attraction between the first and second magnets applies the closing torque between the housing relative and the input arm; and
the predetermined range is about 25 degrees from the closed position.

19. The hinge of claim 18, wherein:
the first magnet is fixedly coupled with the housing; and
the second magnet is movably received within the housing and operatively coupled with the input arm so as to be moveable toward and away from the first magnet with rotation of the housing with respect to the input arm into and out of the closed position, respectively.

20. The hinge of claim 17 further including a slider extending along a first axis through an opening in an end of the housing, the slider at least partially operatively coupling the spring with the input arm; wherein the housing extends along the first axis, and wherein the spring surrounds a portion of the slider and is captured between a portion of the slider and a portion of the housing such that compression of the spring between the portion of the slider and the portion of the housing applies the balancing torque.

\* \* \* \* \*